(No Model.)
D. B. KELLY.
BELTING JOINT.
No. 460,799. Patented Oct. 6, 1891.
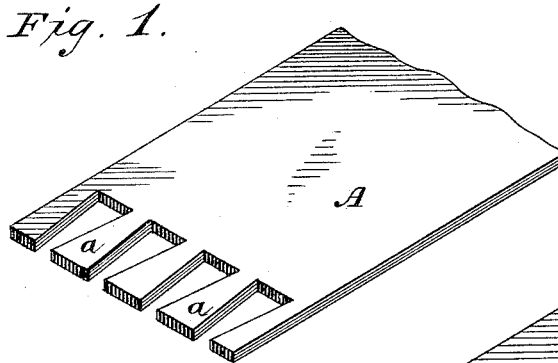
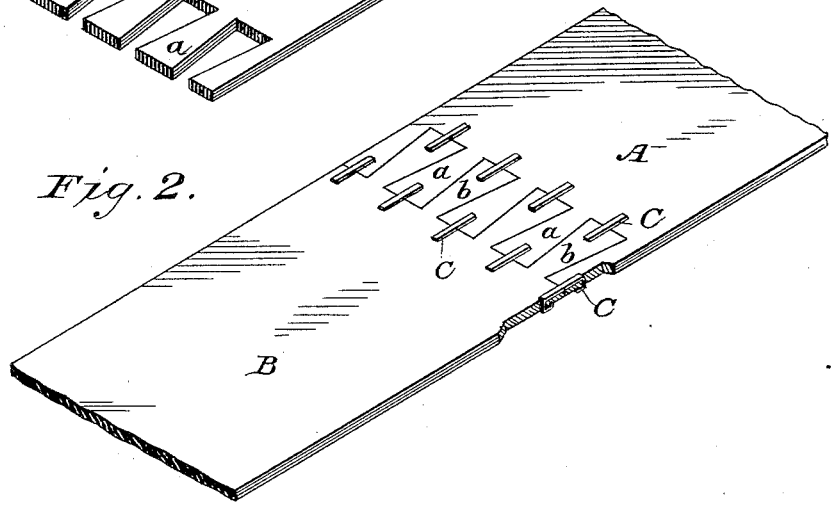
Witnesses
Wm A. Skinkle
C. A. Skinkle
Inventor
David B. Kelly
By his Attorney
W. H. Chadsey

United States Patent Office.

DAVID B. KELLY, OF CHICAGO, ILLINOIS.

BELTING-JOINT.

SPECIFICATION forming part of Letters Patent No. 460,799, dated October 6, 1891.

Application filed February 28, 1889. Serial No. 301,518. (No model.)

*To all whom it may concern:*

Be it known that I, DAVID B. KELLY, a citizen of the United States, residing at Chicago, Illinois, have invented a new and useful Improvement in Belting-Joints of Leather Belting and other Belts for Machine-Pulleys, Wheels, &c., of which the following description, in connection with the accompanying drawings, is a specification, like letters on the drawings representing like parts.

My invention relates to improvements in belt-joints of that order of belts wherein the joints are usually formed by lapping one end of the material forming the belt upon the other end and then fastening the two ends together by rivets, hooks, staples, &c.

The objects of my improvement are, first, to make an even joint—that is, the joint to be practically of the same thickness as the body of the belt; second, to provide a joint that is practically as solid as the solid leather or other material of which the belt is formed; third, to form a belt-joint that shall secure economy or saving over the usual plan of lapping the joining ends of belting.

The invention consists in the combinations of parts expressed in the claim.

Figure 1 is an illustration of one of the ends of a piece of belting slotted for connection with another end. Fig. 2 is an illustration of the two slotted ends of belting matched together and fastened by hooks and cement, a portion being broken away to show the manner of the hooks' engagement.

The ends A and B of belting are provided with slots, the slots in the portion A corresponding with the pieces left after slotting the portion B, whereby the portions thus cut into shape at the ends of the belt may interconnect, as shown in Fig. 2. I cut dovetail slots in the ends of the belt to be joined and connect them together, as shown in Fig. 2, using cement to fasten the cut abutting edges and employing hooks C to fasten the strips or fingers $a$ $b$, respectively, to the opposite ends. The cement used is such as is ordinarily used in fastening the ends of belts in joining the same. The portions $a$ $b$ are cemented together and each of said portions is fastened by one end of a hook C passing therethrough at a short distance from its end, the other end of the hook passing through a solid portion of the opposing end of the belt, and each end of the hook is clinched fast beneath, as shown at the broken-away part in Fig. 2.

In the construction of my belt-joint I ordinarily make use of about two inches of each end of the belt or piece of leather or other material comprising the belt to form a joint, whereas in the old common style of lapping a joint it requires from six to eighteen inches, and the joint being of the same substance as the body of the belt it runs smoother and with less jar than one constructed in the usual old manner, the joint being withal stronger and more durable.

Having thus fully described my invention, what I claim, and desire to secure in Letters Patent, is—

A belt having each end provided with dovetail strips or fingers $a$ $b$, interconnected or interlocked, and having the entire contiguous or abutting edges both of the sides and ends of said interlocking strips or fingers securely cemented together, and having the additional fastenings of hooks C passing through the strips a short distance from their ends and through solid portions of the belt, substantially as and for the purpose described.

In testimony whereof I affix my signature in presence of two witnesses.

DAVID B. KELLY.

Witnesses:
WILLIAM H. CHADSEY,
FRANK O'NEIL.